(12) United States Patent
Sastry et al.

(10) Patent No.: US 7,550,165 B2
(45) Date of Patent: Jun. 23, 2009

(54) METHOD AND APPARATUS FOR PEELING PRODUCE

(75) Inventors: Sudhir Sastry, Dublin, OH (US); Pisit Wongsa-Ngasri, Bangkok (TH)

(73) Assignee: The Ohio State University Research Foundation, Columbus, OH (US)

( * ) Notice: Subject to any disclaimer, the term of this patent is extended or adjusted under 35 U.S.C. 154(b) by 629 days.

(21) Appl. No.: 10/864,663

(22) Filed: Jun. 9, 2004

(65) Prior Publication Data

US 2005/0019464 A1 Jan. 27, 2005

Related U.S. Application Data

(60) Provisional application No. 60/476,974, filed on Jun. 9, 2003.

(51) Int. Cl.
*A23L 1/27* (2006.01)
(52) U.S. Cl. ............... 426/244; 426/479; 426/481; 426/482
(58) Field of Classification Search ............... 426/467, 426/479, 481–482, 237, 244
See application file for complete search history.

(56) References Cited

U.S. PATENT DOCUMENTS

| | | | | |
|---|---|---|---|---|
| 1,747,002 A | * | 2/1930 | Hamilton et al. ............ | 426/482 |
| 2,730,149 A | * | 1/1956 | Aguilar et al. .............. | 426/241 |
| 2,747,635 A | * | 5/1956 | Kofoid ....................... | 426/244 |
| 2,995,166 A | * | 8/1961 | Burley et al. ................ | 426/241 |
| 3,077,217 A | * | 2/1963 | Hind .......................... | 426/482 |
| 3,339,603 A | * | 9/1967 | Dall'Argine et al. ......... | 99/540 |
| 3,351,112 A | * | 11/1967 | Creed et al. ................. | 426/482 |
| 4,099,454 A | | 7/1978 | Theimer et al. | |
| 4,739,140 A | * | 4/1988 | Reznik ....................... | 219/771 |
| 5,229,160 A | * | 7/1993 | Lang .......................... | 426/615 |
| 5,560,287 A | | 10/1996 | Petelle et al. | |
| 6,305,271 B1 | | 10/2001 | Overbeek | |
| 6,537,600 B1 | * | 3/2003 | Meldrum ..................... | 426/102 |
| 6,787,105 B2 | * | 9/2004 | Robbins ...................... | 422/22 |
| 6,821,540 B2 | * | 11/2004 | Cousin et al. ............... | 426/237 |
| 2003/0165608 A1 | * | 9/2003 | Cousin et al. ............... | 426/615 |

* cited by examiner

*Primary Examiner*—Jennifer McNeil
*Assistant Examiner*—Steven Leff
(74) *Attorney, Agent, or Firm*—Standley Law Group LLP

(57) ABSTRACT

An apparatus and method of peeling produce is described comprising adding an electrically conductive fluid and a produce having a peel to a container and subjecting the fluid and the produce to an electrical field to produce a current sufficient to rupture the peel from the produce.

6 Claims, 7 Drawing Sheets

METHOD AND APPARATUS FOR PEELING PRODUCE

CROSS-REFERENCES TO RELATED APPLICATIONS

This application claims priority to U.S. Provisional Application No. 60/476,974 filed Jun. 9, 2003.

FIELD OF THE INVENTION

The present invention relates to methods and devices for removing peel from produce, and more specifically to improved methods and devices for peeling tomatoes. These methods and devices may be applied to peeling other produce as well, especially those having skin and flesh structures similar to that of a tomato.

BACKGROUND OF THE INVENTION

It is common in many food processing applications to remove the outer skin of produce. Peeling of produce is performed for appearance, quality, or other purposes, such as to ensure uniform heating during additional processing operations. Where appearance and/or yield of a product is important, efficient peeling is fundamental to retain as much of the flesh of the produce as possible. Methods of peeling developed for commercial processing involve chemically or mechanically removing the skin from the flesh of the produce.

The tomato processing industry has developed a number of methods for peeling tomatoes where the processor desires that the end product remain firm and void of peel. Typical methods include lye peeling and steam peeling. Lye peeling typically involves submersing or spraying the tomato with a hot caustic solution, such as a 10-15% solution of sodium hydroxide (NaOH) or 7-18% solution of potassium hydroxide (KOH) (Concentrations may vary from 2M to 6M or 8% to 25% depending on commodity, cultivars, maturity, and other factors, such as temperatures used). Under these conditions, the peel of the tomato is softened and removed in a single thin layer with the flesh remaining mostly intact. This method normally results in maximum recovery of tomato flesh mass.

Lye peeling suffers from the disadvantage that a caustic material (NaOH or KOH) is used, resulting in operator hazards and the need to treat the effluent before discharge into the environment. A more preferred method currently used in the industry is to use a lye solution to treat the tomato peel, remove the peel and the peeled tomato from the solution, and then neutralize the solution with an acid, yielding salt and water. The neutralizing of the solution prior to disposal eliminates most of the adverse effect on the environment.

Steam peeling is also used commercially to remove the peel from a tomato. In steam peeling, tomatoes are exposed to steam to loosen the skin, which is then removed by mechanical means. Although more environmentally benign than lye peeling, tomato steam peeling does not yield as much flesh during peel removal as lye peeling, as the exposure of the tomato to high temperature steam causes some heating of the flesh of the tomato as well as the peel. Steam peeling frequently results in inferior peels, where some peel remains adhered to the skin, or the flesh is softened underneath, or both.

As existing methods for peeling produce, such as tomatoes and the like, have certain disadvantages, a need exists for a method of peeling produce to achieve optimum peel removal with minimum yield loss with by-products of the peeling process being environmentally compatible.

SUMMARY OF THE INVENTION

The present invention encompasses an apparatus and method for removing skins or peels from produce resulting in a whole peeled product. The apparatus and method of the present invention are useful in the peeling of a variety of produce, including but not limited to tomatoes.

The apparatus of the present invention comprises, briefly, a container and a variable power supply connected to the container by electrodes. The container contains an electrically conductive fluid and a produce having a peel that is immersed in the fluid. In an embodiment, the electrodes are substantially the same height and width as an area of the container containing the immersed produce and are approximately 6.2 cm apart. When the power is energized, a current is produced in the fluid and the produce. The current, after a sufficient time, ruptures the peel from an outer layer of flesh of the produce.

In an embodiment, the apparatus may further comprise 1) means to admit and discharge the fluid and the produce to and from the container; 2) a separator to separate the fluid from the peeled produce and ruptured peel; a transporter to transport the produce through or in and out of the container; and a motion producer to create motion in the fluid and the produce in the container.

The fluid may be water, a salt solution, an alkaline solution or a salt solution-alkaline solution mixture. The salt solution is preferably a sodium chloride (NaCl) or a potassium chloride (KCl) solution. The caustic solution is preferably a sodium hydroxide (NaOH) or a potassium hydroxide (KOH) solution. Mixtures are preferably an about 0.01 NaCl solution-an about 0.5 NaOH solution; an about 0.01 NaCl solution-an about 1.0 NaOH solution; an about 0.01 KCl solution-an about 0.5 NaOH solution; an about 0.01 KCl solution-an about 1.0 NaOH solution; an about 0.01 NaCl solution-an about 1.0 KOH solution; an about 0.01 NaCl solution-an about 0.5 NaOH solution; an about 0.01 KCl solution-an about 0.5 KOH solution; and an about 0.01 KCl solution-an about 1.0 KOH solution. The fluid may further comprise an additive.

The invention also comprises a method of removing a peel from produce having a peel comprising the steps of adding an electrically conductive fluid and produce to a container, subjecting the fluid and the produce to a current for a time sufficient to remove the peel from the produce, and removing the produce from the container. The fluid may be at room temperature (about 20° C. to about 25° C.) prior to the application of the current, or may be heated or cooled.

In an embodiment, when the current is applied to the fluid and the produce, boiling fronts start at the blossom end and the stem end of the produce between the peel and the outer flesh and advance toward each other. Pressure caused by the boiling fronts rupture the peel, leaving a whole, peeled produce. The peel and the peeled produce are removed from the container and are ready for further processing.

Embodiments using 1) a mixture of an about 0.01 salt solution-an about 1.0 NaOH solution and a voltage of about 40V to about 90V, and more specifically about 40V to about 75V, and most specifically 75V; 2) a mixture of an about 0.01 salt solution-an about 0.5 NaOH solution and a voltage of about 75V to about 100V, and more specifically 75V; 3) a mixture of an about 0.01 salt solution-an about 0.5 KOH and a voltage of about 75V to about 125V; and 4) a mixture of an about 0.01 salt solution-an about 1.0 KOH solution and a voltage of about 50V to about 100V, more specifically, 50V to about 75V, provided satisfactory peel removal with low loss of produce weight (flesh).

A more complete, although not necessarily exhaustive, detailing of the features and embodiments of the invention is included in the following description and the claims. The above summary is not intended to be an exhaustive discussion of all the features or embodiments of the present invention.

DESCRIPTION OF THE PREFERRED EMBODIMENTS

Figure 1:
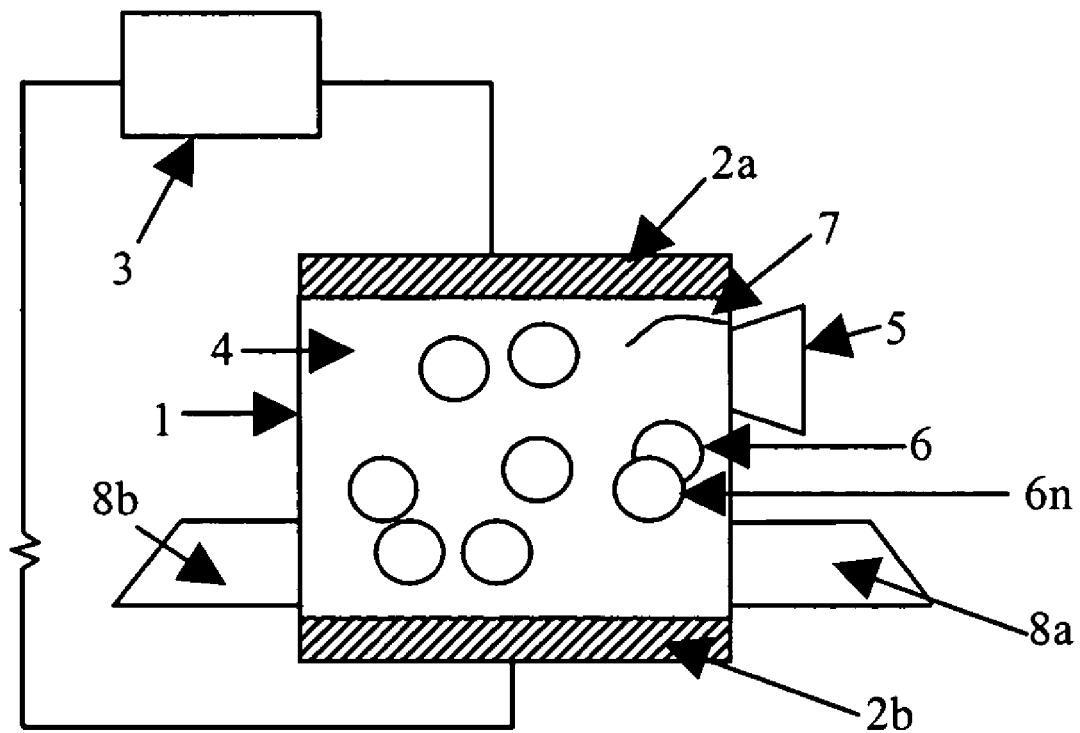
FIG. 1 is a diagrammatic representation of the apparatus of the present invention.

The present invention encompasses an apparatus and method for removing skins or peels from produce having peels, yielding a whole peeled product. As used herein, produce includes fruits, vegetables, and the like. The apparatus of the present invention comprises a container formed to contain and equipped to admit and discharge an electrically conductive fluid in which produce is immersed. An electrical system including electrodes is connected to the container to provide a current to be applied to the fluid and the produce. The container may include a separator to separate the fluid from the processed produce and any produce particles. The apparatus may optionally include a transporter or means to transport the produce through or in and out of the container and a motion producer to create motion in the fluid-produce mixture.

In an embodiment of the present invention, produce, such as a tomato or other food having skin structures similar to that of a tomato, is submerged in an electrically conductive fluid. The fluid, which may be water or a solution, including but not limited to a solution comprising a salt, such as sodium chloride (NaCl) or other like compound; a mixture of a salt solution and/or a caustic solution, such as, but not limited to, an NaOH or KOH solution, or other similar solution, is subjected to ohmic heating. The term "ohmic heating" as used herein refers to any passing of a current through a fluid-substance mixture to create heat in areas of the substance in the fluid.

The method of ohmic heating in food processing has been described in previous references such as *Minimal Processing of Foods and Process Optimization: an Interface*; (Chapter 2: "Ohmic Heating"; R. P. Singh, F. A. R. Oliveira, Eds.: 17-33; CRC Press, Inc., 1994; Boca Raton, Fla.) and *McGraw-Hill Yearbook of Science and Technology* ("Ohmic Heating"; pp. 129-130; McGraw-Hill Book Company, 1996), each of which are incorporated herein by reference.

Ohmic heating is an efficient technique when used in food processing. Unlike conventional food processing methods such as canning, which relies heavily on external heat penetration of the food, ohmic heating uses the inherent electrical properties of the food to generate heat in areas other than the outer surface of the food when an electrical current is passed through the food. When the food-liquid system of the present invention is subjected to an electric current, non-uniform heating of the system occurs due to the heterogeneity of electrical properties inherent in the food and the fluid. The heating rate of the food-liquid system during ohmic heating is affected by factors such as, but not limited to, the voltage applied to the system, the distance between electrodes, the properties of the food, such as electrical conductivity, homogeneity, etc., and the properties of the liquid. The rate of heating is directly proportional to the square of the electric field strength (E), and the electrical conductivity ($\sigma$), where E is the voltage used divided by the distance between the electrodes.

Using ohmic heating as applied to the present invention, with time, the skin or peel of the produce ruptures from a buildup of pressure created by resultant heating caused by sub-epidermal electrical activity. Although minor internal heating may take place, the principal locus of heat build up is underneath the peel next to the outer flesh of the produce. After rupture, the peel and the remaining whole portion of the produce are removed from the fluid.

FIG. 1 depicts a diagrammatic representation of the apparatus of the present invention. The apparatus includes a container 1 with electrodes 2a, 2b connected to a variable power supply 3 and to the container 1 to create a current that flows through a fluid 4 and one or more produce 6, 6n contained in the container 1. In FIG. 1, the electrodes 2a, 2b encompass substantially the entire cross-sectional area occupied by the produce 6, 6n and the fluid 4 in order to apply optimal current to the produce 6, 6n; however, other electrode placement, size and area of contact may be used in the present invention. The container 1 may alternatively be a container adapted to allow a continuous flow of produce through the container, wherein the produce would be moved into the container, treated with fluid and subjected to current while in the container, and moved out of the container.

The apparatus comprises a separator or means for separating 5 peeled produce and peel removed from the produce contained in the fluid 4 from each other, the container 1, and the fluid 4. The separator is any arrangement that results in the peeled produce existing substantially free from peel and fluid. The separator may include, but is not limited to, a siphon, a strainer, a gravitational device, a screen, a scoop, liquid movement, and the like.

The fluid 4 may comprise water, a salt solution, an alkaline solution, and mixtures thereof. Optionally, the container 1 may include a motion inducer to induce fluid motion 7 and or a conveyor or means to convey 8a, 8b the produce through, or in or out of the container. A motion inducer 7 may be, but is not limited to, one or more paddle, fan, or the like; a device that moves all or part of the container wall; introduction of a fluid or gas into the container; and the like.

A conveyor or means to convey 8a, 8b the produce through the container includes but is not limited to one or more conveyor belt, a sluice system, and the like. The conveyor 8a, 8b may alternatively be a system that moves all or a part of the container to accept the fluid and or the produce and then moves all or a part of the container after produce processing to remove the produce and or contents of the container.

One skilled in the art will understand that FIG. 1 and the description of the present invention herein are presented for purposes of illustration and that the physical design of the apparatus of the present invention should not be restricted to only one configuration, but rather may be of any configuration which essentially accomplishes the same effect, including but not limited to various configurations and placement of electrodes, the shape and configuration of the container, and the fluid used.

Fluids that yield optimal peeled produce in the invention are, but are not limited to, varying concentrations of a mixture of a salt solution with an alkaline solution. Examples of fluids used in the apparatus are mixtures of an NaCl solution with an NaOH solution and mixtures of an NaCl solution with a KOH solution, however, any like solution may be used. The fluid of the invention may also comprise the addition of other solutions, including but not limited to firming agents, such as calcium chloride, esterfying enzymes, etc., as well as other additives and agents.

Among the parameters affecting the system of the invention are: the electrical conductivity of the produce and differences in the conductivity within the produce itself; temperature, the design of the container, including the gap between electrodes; fluid motion; the residence time, distribution, and thermophysical properties of the produce; and electric field strength. Optimization of the peeling operation to achieve adequate peel removal without excessive yield loss of the remaining whole produce involves balancing these factors.

The method of the invention for peeling a produce will now be described. For purposes of explaining the invention, processing to remove the peel of a tomato is described, however, the invention is useful for removing the peel of any produce having a peel or similar skin.

Figure 2:
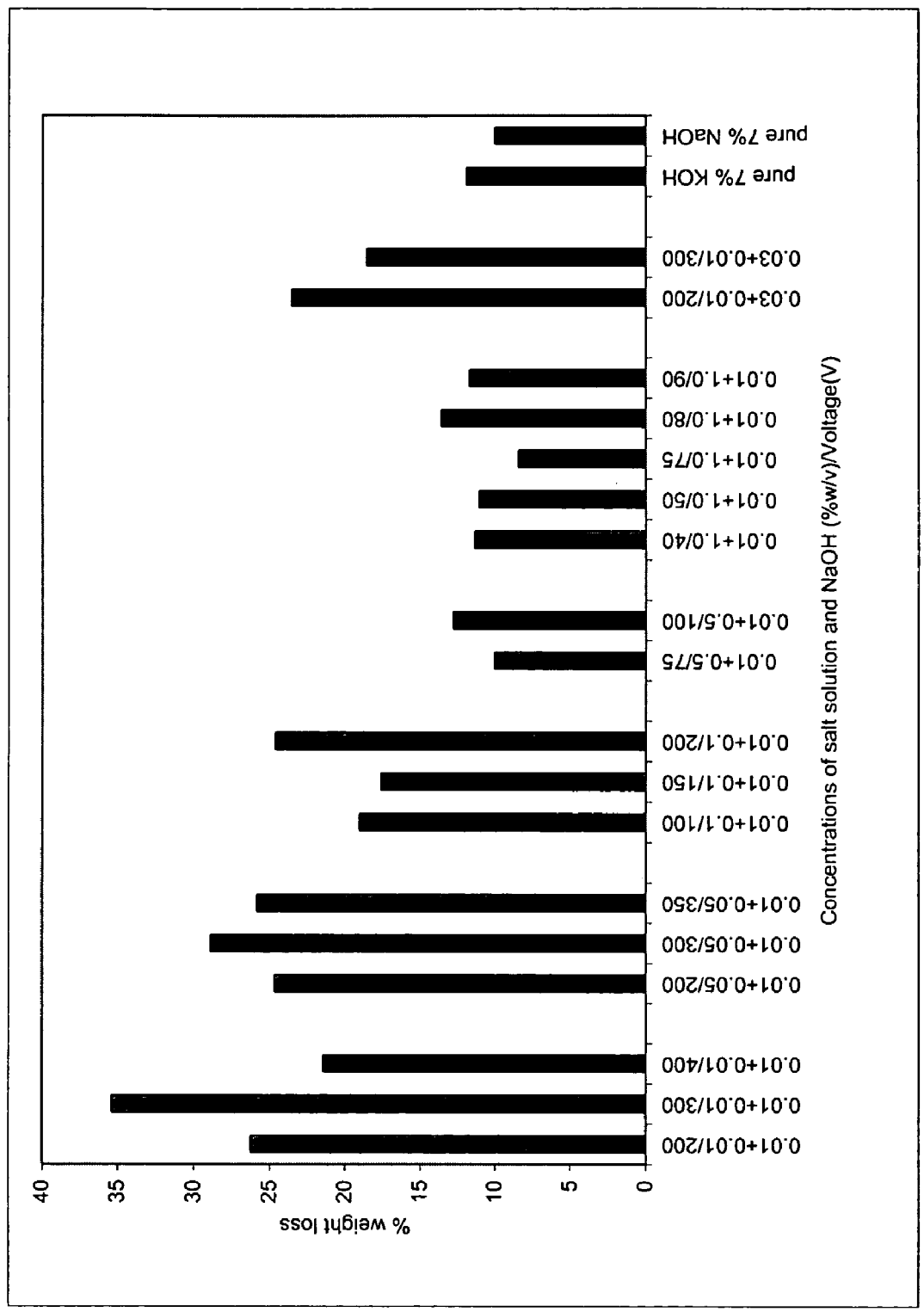
FIG. 2 is a chart depicting an embodiment of a comparison of percentages of weight loss of tomatoes peeled using NaOH in a salt solution mixture in different embodiments of the invention versus tomatoes peeled using conventional lye peeling.
Figure 3:
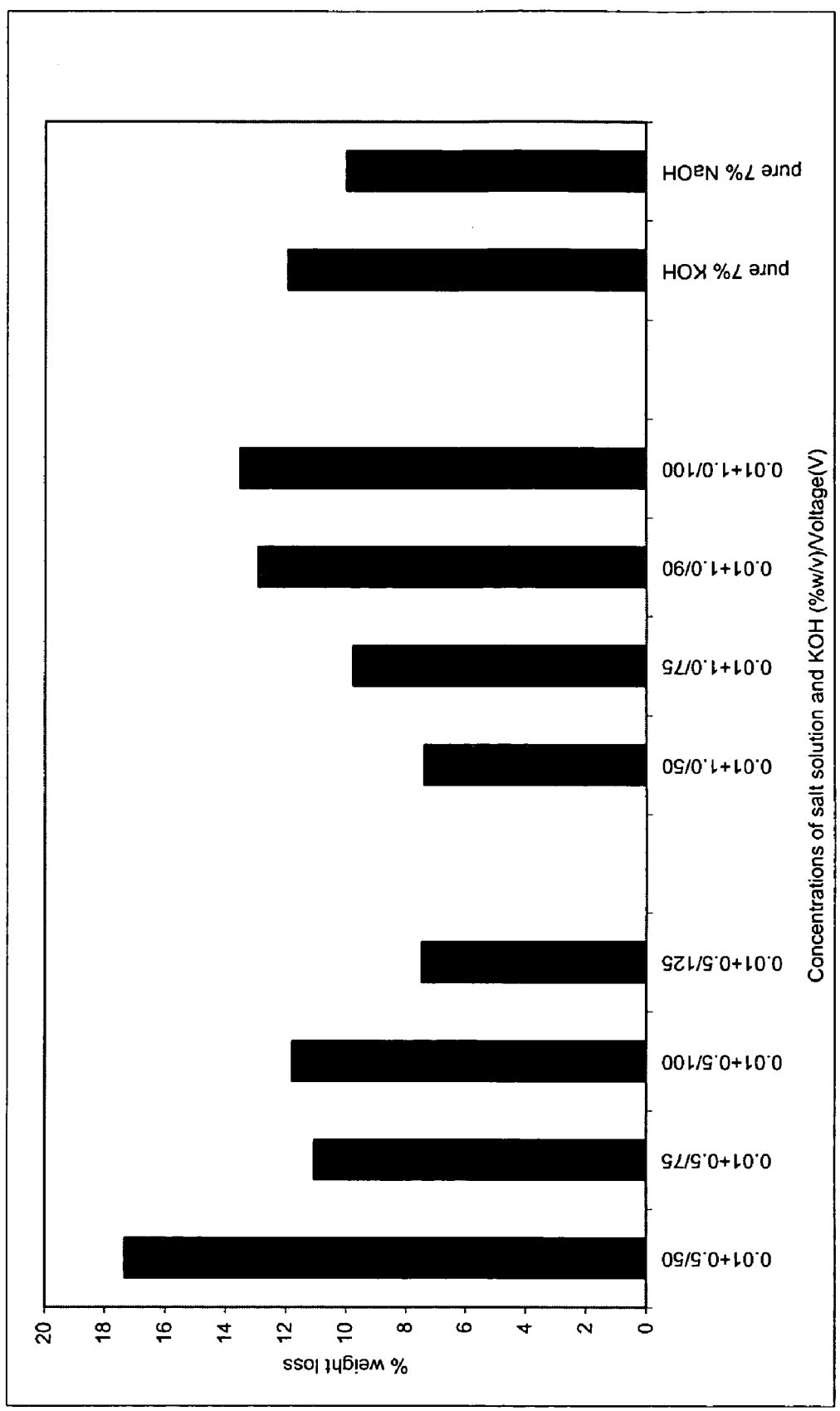
FIG. 3 is a chart of an embodiment depicting a comparison of percentages of weight loss of tomatoes peeled using KOH in a salt solution mixture in different embodiments of the invention versus tomatoes peeled using conventional lye peeling.

In an embodiment, one or more tomato is placed in a container including an electrically conductive liquid. As discussed above, the liquid may comprise varying concentrations of a mixture of a solution comprising a salt combined with an alkaline solution. Examples of fluids are mixtures of a salt solution with an NaOH solution and mixtures of a salt solution with a KOH solution, however, any like solution may be used. Acceptable salt solutions are NaCl and KCl; however other salts may be substituted and additional solutions may also be added to the salt solution-alkaline solution mixture. As shown in FIG. 2 fluids include a range of about 0.01 to about 0.03 salt solutions combined with various NaOH % w/v ranging from about 0.01 to about 1.0. Preferred mixtures include an about 0.01 salt solution with an about 1.0 NaOH solution and an about 0.01 salt solution with an about 0.5 NaOH solution. As shown in FIG. 3, fluids include an about 0.01 salt solution combined with various KOH % w/v ranging from about 0.5 to about 1.0.

Electrodes are connected to or associated with the container. The electrodes are further connected to a variable power source. The power source is activated and a current is produced through the produce and the fluid. The strength of the current applied to the fluid impacts the time to and amount of peel rupture. Voltages used depend upon the gap between the electrodes, the fluid used, and the conductivity of the produce.

Depending on the size of the container and the amount of and type of produce processed, desired electric field strengths vary based on the conductivity of the produce and the fluid used, the voltage, and the distance between electrodes. In an embodiment, voltages range from about 40V to about 400V. In an embodiment using a small sample, voltages range from about 50V to about 125V and the gap between the electrodes is about 6.2 cm. In this embodiment, the resulting electric field strength is equal to about 20.16 V/cm. Larger masses of produce require a greater gap between electrodes and may require different voltages.

When the power source is energized, current flows between the electrodes though the fluid and the produce. Where the electrical conductivity of the produce in the fluid is higher than that of the fluid, the produce heats faster than the fluid heats. Current channels through the more conductive parts of the produce, creating high current density regions. Higher energy generation rates occur as a result within given areas of the produce.

As an example, when tomatoes are used as produce in the fluid and subjected to an electrical field, two high current density regions, or boiling fronts, typically occur between the inside of the peel of the tomato and the outer flesh of the tomato: one starting from the blossom end of the tomato and one starting at the stem end of the tomato. With time, the boiling fronts advance under the skin surface and above the outer flesh portion of the tomato toward each other. The tomato peel eventually ruptures from the pressure buildup that results from the energy generation. The peel is then easily removed from the remaining flesh, resulting in a whole peeled tomato. While the boiling fronts occur in some instances, they do not occur in all cases, thus the practice of this invention is not to be interpreted as being restricted only to situations when boiling fronts occur.

Figure 6:
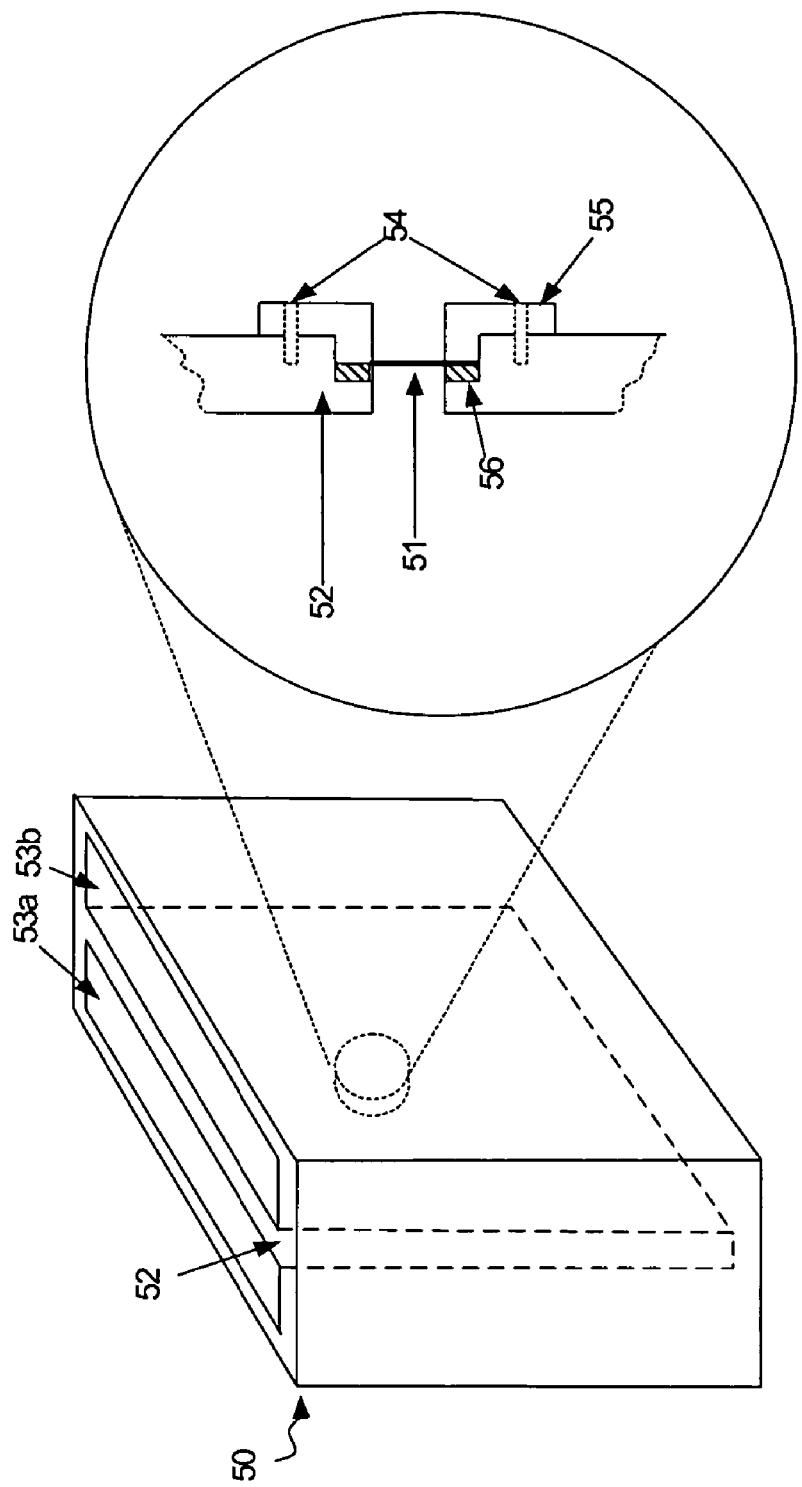
FIG. 6 is a diagrammatic representation of a measuring device to measure the diffusivity of solutions through produce in an embodiment using the skin of a tomato.

To determine the effectiveness of the process in an embodiment of the invention, a sample of tomato skin was held between two reservoirs 53a, 53b (as shown in FIG. 6), and the rate of diffusivity of solution through the skin was determined over time under ohmic heating conditions and without ohmic heating. In this example, sodium hydroxide was used; however, any suitable solution may be substituted.

As shown in FIG. 6, a tomato skin 51 was placed in a container 50 between two chambers 53a, 53b. A solution of NaOH was placed in the first chamber 53a at 50° C. The amount of NaOH in the second chamber 53b was measured at specific sampling times from approximately 0-1300 seconds under ohmic heating conditions and without ohmic heating.

Figure 7:
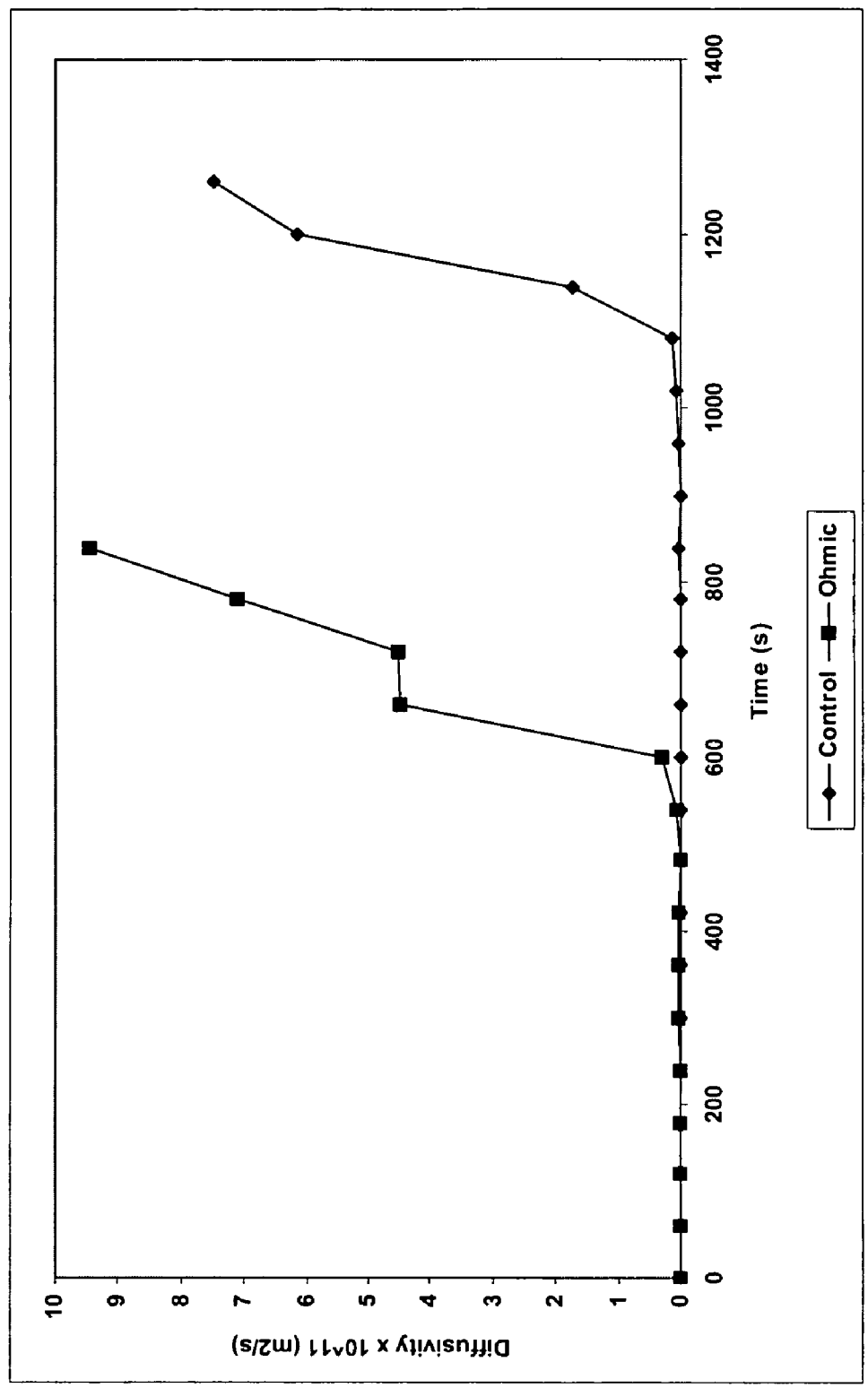
FIG. 7 is chart of an embodiment depicting diffusivity values of NaOH through the skin of a tomato over time in ohmic conditions versus control conditions at 50° C.

FIG. 7 is a chart of the results showing that the process of the invention accelerates the diffusivity of a solution such as sodium (or potassium) hydroxide through produce skin, such as a tomato. As shown in the chart of FIG. 7, when an electric field is applied, the diffusivity increased (due to cellular breakdown) in approximately one-half the time over diffusion of solution without ohmic heating, indicating a significant acceleration of the process.

The produce peeled, the composition of the solutions comprising the fluid, and the voltage applied to the fluid-produce system described above are among factors that effect the time necessary for a peel to rupture. The electrical conductivity of the particular produce selected to be peeled affects the rate of energy produced between the peel and the outer flesh, and thus the time to peel rupture. Increasing voltage causes the energy to build at a faster rate and cracking/rupture occurs sooner in time; however, increasing the voltage too much results in soft flesh of the remaining produce due to at least a partial invasion of the flesh by one or more boiling fronts, or by heat transfer to the flesh. Embodiments using voltages as described herein result in the removal of the peel while retaining an acceptable texture and appearance of the remaining flesh of the produce.

Other parameters, including but not limited to, the temperature of the fluid and fluid movement further effect the time to peel rupture. The initial temperature of the fluid impacts rupture rate. The standard temperature required for conventional lye process peeling is approximately 90° C., necessitating the application of a given amount of energy to achieve the required temperature. The method of the present invention allows for fluid temperatures at the initiation of processing of approximately room temperature (about 20° C. to about 25° C.), resulting in a fluid temperature after peeling typically in the range of about 75° C. to about 80° C.

FIG. 2 and FIG. 3 depict processing starting at room temperature. Higher or lower temperatures may be used as an initial temperature. Increasing the initial temperature of the fluid results in a more rapid rupture rate, due to the correlation between temperature and time. As the method of the present invention facilitates peeling at a lower temperature than that needed for conventional methods, the invention conserves energy as compared to conventional lye peeling methods.

The quality of peeling is a function of weight loss of the produce versus a complete removal of the peel of the produce. The present invention includes controlling parameters so not to cause the one or more boiling fronts or excessive heat transfer to invade the outer flesh proximate to the inside of the peel of the produce, which results in greater weight loss (i.e., flesh) during peeling and undesirable qualities, such as softness and color distortion, in the whole peeled produce. The invention obtains a clean removal of the peel, wherein the skin comes off, but the flesh underneath remains firm and relatively unaffected by the treatment.

Field strengths differ depending on whether a NaOH solution or a KOH solution is used. FIG. 2 depicts a comparison of percentages of total weight loss of produce processed using the present invention to remove the peel from the produce. In separate embodiments, differing amounts of various concentrations of a NaCl solution and a NaOH solution are mixed to form individual fluids. Certain of the fluids are then subjected to varying voltages.

As an example, tomatoes are measured and weighed before and after processing to remove the peel using various fluids comprising mixtures of various concentrations of a NaCl solution and a NaOH solution subjected to various voltages. FIG. 2 depicts the percent of weight loss of produce after processing in the different fluids at given voltages. FIG. 2 also depicts percent weight loss of tomatoes peeled using conventional lye peeling. Weight loss of produce processed using the invention were measured and compared with weight loss of produce processed using conventional peeling methods using the following formula:

% Weight Loss=Produce wt. before peeling−produce wt. after peeling×100% Produce wt. before peeling As shown in FIG. 2, embodiments comprising fluids comprising mixtures of an about 0.01 salt solution combined with either an about 1.0 NaOH solution or an about 0.5 NaOH solution yield low percentages of weight loss when subjected to voltages of about 40V to about 100V. Embodiments comprising fluids comprising mixtures of an about 0.01 salt solution with an about 1.0 NaOH solution or an about 0.5 NaOH solution yield lower mass loss than produce peeled using either 7% NaOH or 7% KOH alone.

FIG. 3 depicts a comparison of percentages of weight loss of produce peeled in embodiments comprising a KOH solution and a salt solution at given voltages. FIG. 3 also shows weight loss of produce peeled using conventional lye peeling. As in the NaOH embodiments, any suitable salt may be used. As shown in FIG. 3, embodiments comprising fluids comprising mixtures of an about 0.01 salt solution combined with an about 1.0 KOH solution yield low percentages of weight loss of produce processed at voltages of about 50V to about 75V. An embodiment comprising a fluid comprising a mixture of an about 0.01 salt solution and an about 0.5 KOH solution yields a low percentage of weight loss of produce processed when subjected to a voltage from about 75V to about 125V. These embodiments yield lower produce mass loss than processing produce using either 7% NaOH or 7% KOH alone.

As shown by the Figures, optimum produce peeling is obtained using a fluid comprising a less concentrated alkaline solution than concentrations used in conventional lye peel removal processing. The present invention significantly reduces the requirement for adding neutralizing acid to the peeled produce or by-products of the processing method and reduces the impact to the environment from the discard of waste produced in the processing.

Additionally, the invention requires less fluid than that used in traditional peeling. Lye peeling requires a sufficient amount of a KOH or NaOH solution to transfer heat effectively to the produce. The present invention requires an amount of fluid only in sufficient quantity to form a continuous phase between the individual produce, reducing the amount of fluid required to remove the peel. This substantially reduces the quantity of liquid waste generated by the process. Because the present invention uses only small amounts of alkali, it is possible to recover larger fractions of peel than conventional processes, in which much of the peel is dissolved by the lye. The peel has economic value, and may be used in modified form within other products.

Figure 4:
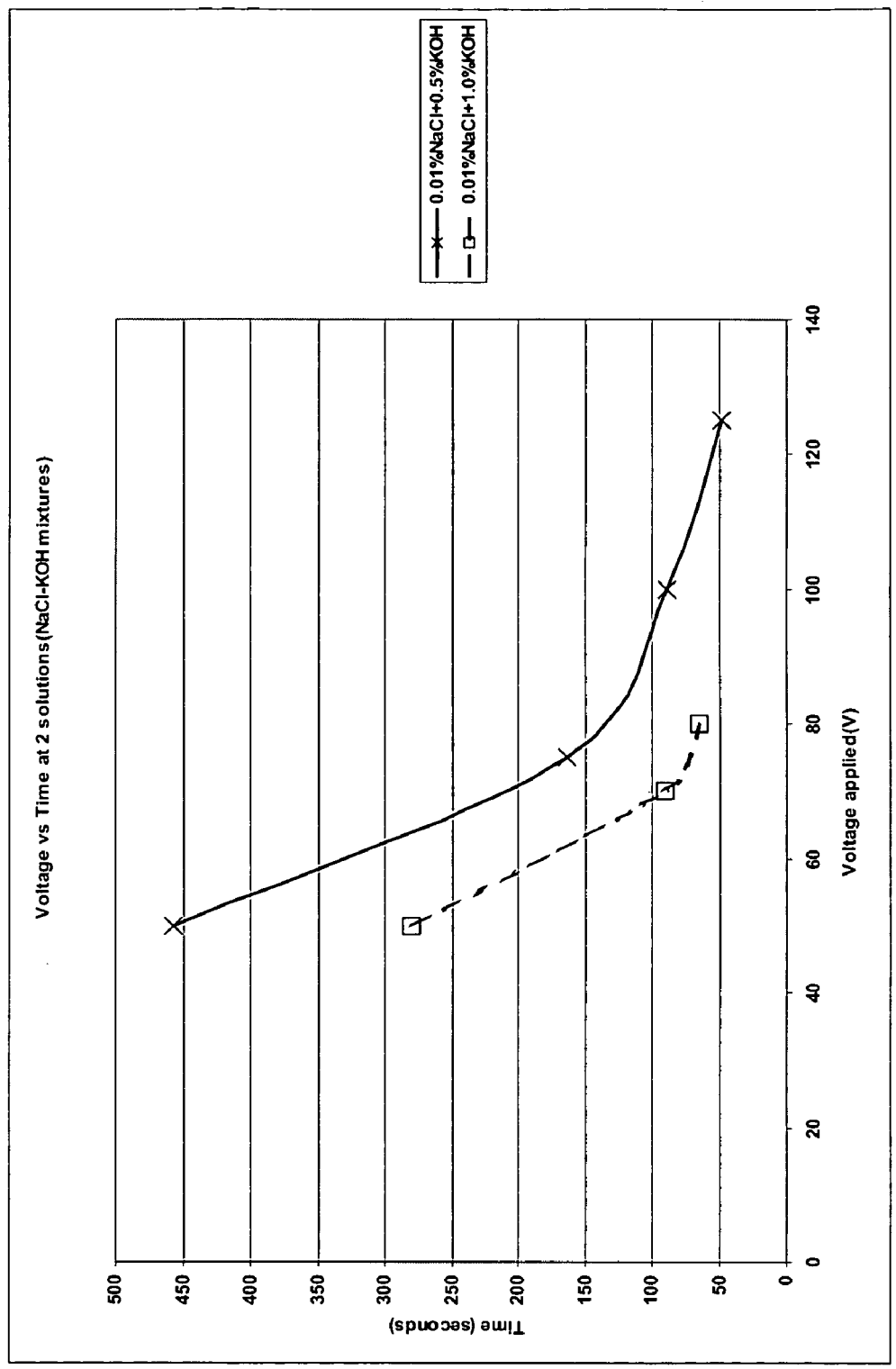
FIG. 4 is a chart of an embodiment depicting the relationship between voltage applied and time when cracking of tomato peel occurred in different sodium chloride (NaCl)/KOH mixture solutions.

FIG. 4 depicts embodiments using different voltages. In the present invention, the time to cracking/rupture of the peel of a produce is influenced by voltage applied. As examples, two different fluids comprising different mixtures of an NaCl solution and a KOH solution (about 0.01% NaCl with about 0.5% KOH; and about 0.01% NaCl with about 1.0% KOH) each containing a small sample of tomatoes, when subjected to voltages ranging from about 50V to about 125V produce decreased time to rupture of the peel using higher voltages. Embodiments comprising fluids comprising lower concentrations of KOH solutions produce cracking/rupture of the peel at less than about 100 seconds at voltages of about 90V to about 125V. An embodiment comprising an about 0.01% NaCl solution and an about 0.5% KOH solution produces cracking/rupture of the peel at about 50 seconds at a voltage of about 125V. Other embodiments comprising fluids comprising higher concentrations of KOH solutions produce cracking/rupture of the peel at less than about 100 seconds at voltages of about 70V to about 80V. An embodiment comprising an about 0.01% NaCl and an about 1.0% KOH produces cracking/rupture of the peel at about 60 seconds at a voltage of about 80V.

Figure 5:
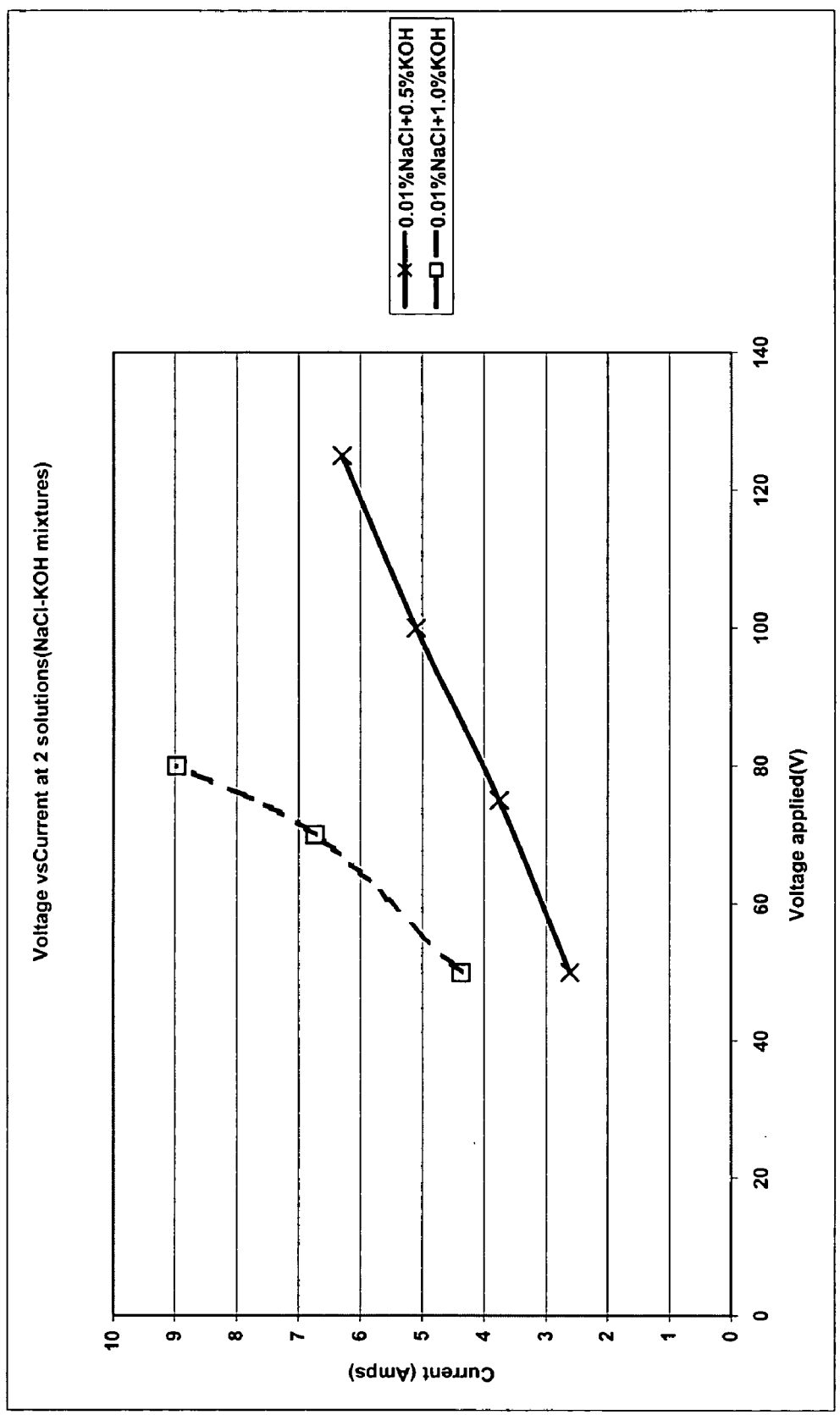
FIG. 5 is a chart of an embodiment depicting the relationship between voltage applied and current when cracking of tomato peel occurred in different NaCl/KOH mixture solutions.

FIG. 5 shows currents produced at the moment of cracking/rupture of the peel using different voltages and different fluids of the present invention. As an example, fluids comprising different mixtures of an NaCl solution with a KOH solution (about 0.01% NaCl with about 0.5% KOH; and about 0.01% NaCl with about 1.0% KOH) each containing a small sample of tomatoes, were subjected to voltages ranging from about 50V to about 125V. Current produced at the moment of cracking/rupture of the peel increases using higher voltages in each of the fluids. Embodiments comprising fluids comprising higher concentrations of KOH solutions produce currents at the moment of cracking/rupture of the peel ranging from about 4 amps to about 9 amps at voltages from about 50 V to about 80V. An embodiment comprising an about 0.01% NaCl solution and an about 1.0% KOH solution produces a current at the moment of cracking/rupture of the peel of about 4 amps using a voltage of about 50V. Embodiments comprising fluids comprising lower concentrations of KOH solutions produce currents at the moment of cracking/rupture of the peel ranging from about 2.5 amps to about 6 amps at voltages from about 50V to about 120V. An embodiment comprising an about 0.01% NaCl solution and an about 0.5% KOH solution produces a current at the moment of cracking/rupture of the peel of about 2.5 amps using a voltage of about 50V.

The following tables show various combinations of the invention:

TABLE I

| NaCl [ ] + NaOH (% w/v) | Voltage (V) | major axis a (cm) | minor axis b (cm) | surface area (cm2) | wt b/f thing (g), init | wt a/t hting w/o peel | Peel wt (g) | peel/init | wt loss per init (%) | Date |
|---|---|---|---|---|---|---|---|---|---|---|
| 0.01 + 0.05 | 350 | 5.1 | 3.65 | 13.94464 | 37.506 | 25.076 | 2.737 | 0.07297 | 33.14136 | 12/13 |
| 0.01 + 0.05 | 200 | 5.6 | 4.1 | 10.95579 | 52.152 | 46.439 | 3.331 | 0.06387 | 10.95452 | 12/13 |
| 0.01 + 1.0 | 40 | 5.85 | 3.8 | 18.82721 | 44.923 | 0 | 0 | 0 | 100 | 12/15 |
| 0.01 + 1.0 | 90 | 5.4 | 4 | 15.42894 | 48.265 | 42.623 | 3.377 | 0.06997 | 11.68963 | 12/15 |
| 0.01 + 0.01 | 400 | 5.9 | 4.15 | 18.77024 | 48.715 | 33.233 | 4.005 | 0.08221 | 31.78077 | 12/15 |
| 0.01 + 0.01 | 300 | 5.5 | 3.1 | 16.91377 | 38.791 | 25.163 | 2.781 | 0.07169 | 35.13186 | 12/15 |
| 0.01 + 0.01 | 200 | 5.8 | 4 | 18.24663 | 48.897 | 41.521 | 2.956 | 0.06045 | 15.08477 | 12/15 |
| 0.01 + 0.1 | 100 | 5.9 | 3.93 | 19.0492 | 50.867 | 41.648 | 1.797 | 0.03533 | 18.12373 | 1/8 |
| 0.01 + 0.1 | 200 | 6 | 3.8 | 19.89435 | 41.494 | 33.196 | 2.03 | 0.04892 | 19.99807 | 1/8 |
| 0.01 + 0.1 | 150 | 5.45 | 4.05 | 15.69472 | 43.728 | 37.527 | 1.574 | 0.036 | 14.18085 | 1/8 |
| 0.01 + 0.5 | 100 | 5.83 | 4.5 | 17.6416 | 53.03 | 44.839 | 3.095 | 0.05836 | 15.44597 | 1/8 |
| 0.01 + 0.5 | 100 | 5.55 | 3.95 | 16.5456 | 43.14 | 37.586 | 2.599 | 0.06025 | 12.87436 | 1/8 |
| 0.01 + 0.5 | 75 | 6.12 | 3.85 | 20.72009 | 50.765 | 47.095 | 1.413 | 0.02783 | 7.22939 | 1/8 |
| 0.03 + 0.01 | 200 | 5.1 | 4 | 13.38424 | 44.338 | 33.906 | 2.839 | 0.06403 | 23.52835 | 1/9 |
| 0.03 + 0.01 | 300 | 5 | 4.3 | 12.04653 | 46.682 | 37.728 | 2.022 | 0.04331 | 19.18084 | 1/9 |
| 0.03 + 0.01 | 300 | 5.8 | 4.12 | 18.08143 | 45.476 | 37.332 | 2.279 | 0.05011 | 17.90835 | 1/9 |
| 0.01 + 0.1 | 100 | 5.4 | 3.9 | 15.58279 | 41.697 | 34.424 | 1.103 | 0.02645 | 17.4425 | 1/9 |
| 0.01 + 0.1 | 150 | 5.5 | 4 | 16.12332 | 41.475 | 35.168 | 1.615 | 0.03894 | 15.20675 | 1/9 |
| 0.01 + 0.1 | 200 | 6.05 | 3.3 | 20.48858 | 37.913 | 28.091 | 2.648 | 0.06984 | 25.90668 | 1/9 |
| 0.01 + 0.5 | 100 | 5.85 | 3.85 | 18.77742 | 48.081 | 43.878 | 1.571 | 0.03267 | 8.741499 | 1/9 |
| 0.01 + 0.5 | 75 | 5.8 | 3.65 | 18.60891 | 38.009 | 33.162 | 2.476 | 0.06514 | 12.75224 | 1/9 |
| 0.01 + 0.5 | 100 | 5.6 | 3.5 | 17.3656 | 37.228 | 31.959 | 1.904 | 0.05114 | 14.15333 | 1/9 |
| 0.01 + 1.0 | 75 | 5.5 | 4.3 | 15.59372 | 55.598 | 50.922 | 2.028 | 0.03648 | 8.410374 | 1/10 |
| 0.01 + 1.0 | 50 | 5.3 | 4.3 | 14.15813 | 47.987 | 41.747 | 1.525 | 0.03178 | 13.00352 | 1/10 |
| 0.01 + 0.01 | 200 | 5.6 | 4.65 | 15.54988 | 53.89 | 33.729 | 6.516 | 0.12091 | 37.41139 | 1/30 |
| 0.01 + 0.01 | 300 | 5.7 | 4.3 | 17.05354 | 58.038 | 37.352 | 3.724 | 0.06416 | 35.64217 | 1/30 |
| 0.01 + 0.01 | 400 | 5.5 | 4.5 | 15.15984 | 62.949 | 55.972 | 2.703 | 0.04294 | 11.08358 | 1/30 |
| 0.01 + 0.05 | 200 | 4.9 | 4.15 | 11.72209 | 41.062 | 25.282 | 3.131 | 0.07625 | 38.42969 | 1/30 |
| 0.01 + 0.05 | 300 | 5.4 | 4 | 13.8975 | 65.739 | 46.772 | 7.212 | 0.10971 | 28.85198 | 1/30 |
| 0.01 + 0.05 | 350 | 5.15 | 4.4 | 12.85383 | 54.717 | 44.55 | 5.027 | 0.09187 | 18.58106 | 1/30 |
| 0.01 + 0.1 | 100 | 5.65 | 4.1 | 17.02901 | 54.086 | 42.455 | 2.173 | 0.04018 | 21.50464 | 1/31 |
| 0.01 + 0.1 | 150 | 5.1 | 4.05 | 13.28823 | 43.306 | 33.169 | 1.86 | 0.04295 | 23.40784 | 1/31 |
| 0.01 + 0.1 | 200 | 5.2 | 4.3 | 13.44893 | 54.409 | 39.245 | 4.032 | 0.07411 | 27.87039 | 1/31 |
| 0.01 + 1.0 | 40 | 5.5 | 4.45 | 15.27458 | 59.804 | 53.004 | 1.914 | 0.032 | 11.37048 | 1/31 |
| 0.01 + 1.0 | 50 | 5.5 | 4.5 | 15.15984 | 56.598 | 51.454 | 1.381 | 0.0244 | 9.08866 | 1/31 |
| 0.01 + 1.0 | 80 | 5.85 | 4.05 | 18.54225 | 53.903 | 46.592 | 3.633 | 0.0674 | 13.56325 | 1/31 |

TABLE II

| NaCl [ ] + KOH (% w/v) | Voltage (V) | major axis a (cm) | minor axis b (cm) | surface area (cm2) | wt b/f hting (g), init | wt a/t hting w/o peel | Peel wt (g) | peel/init | wt loss per init (%) | Date |
|---|---|---|---|---|---|---|---|---|---|---|
| 0.01 + 0.5 | 50 | 5.65 | 4.1 | 17.02901 | 52.48 | 41.844 | 1.593 | 0.03035 | 20.26677 | 1/14 |
| 0.01 + 0.5 | 75 | 5.5 | 4.25 | 15.6919 | 50.382 | 46.206 | 1.114 | 0.02211 | 8.288675 | 1/14 |
| 0.01 + 0.5 | 100 | 5.45 | 4.6 | 14.54199 | 55.99 | 51.097 | 1.062 | 0.01897 | 8.739061 | 1/14 |
| 0.01 + 1.0 | 50 | 5.9 | 4.1 | 18.83989 | 56.614 | 52.776 | 1.283 | 0.02266 | 6.779242 | 1/14 |
| 0.01 + 1.0 | 75 | 4.95 | 4.3 | 11.69904 | 48.572 | 44.18 | 1.106 | 0.02277 | 9.042247 | 1/14 |
| 0.01 + 1.0 | 76.4 | 5.4 | 3.95 | 15.50778 | 47.278 | 42.892 | 1.854 | 0.03921 | 9.277042 | 1/14 |
| 0.01 + 0.5 | 75 | 4.85 | 4.05 | 11.61396 | 41.765 | 35.425 | 2.06 | 0.04932 | 15.18017 | 1/16 |
| 0.01 + 0.5 | 100 | 5.4 | 3.55 | 16.00335 | 41.622 | 33.905 | 2.478 | 0.05954 | 18.54068 | 1/16 |
| 0.01 + 0.5 | 125 | 5.5 | 4.2 | 10.83214 | 39.295 | 34.594 | 1.886 | 0.048 | 11.96335 | 1/16 |
| 0.01 + 1.0 | 75 | 5.6 | 4.1 | 10.95579 | 52.152 | 46.439 | 3.331 | 0.06387 | 10.95452 | 1/16 |
| 0.01 + 1.0 | 100 | 5.5 | 4.3 | 10.97372 | 56.311 | 46.218 | 4.991 | 0.08863 | 17.92367 | 1/16 |
| 0.01 + 0.5 | 50 | 5.2 | 4.15 | 13.77292 | 42.069 | 36.234 | 1.034 | 0.02458 | 13.87007 | 2/4 |
| 0.01 + 0.5 | 50 | 5.15 | 4.2 | 13.32148 | 57.567 | 47.276 | 1.772 | 0.03078 | 17.87656 | 2/4 |
| 0.01 + 0.5 | 75 | 5.3 | 4.2 | 14.3688 | 55.533 | 50.174 | 1.882 | 0.03389 | 9.650118 | 2/4 |
| 0.01 + 0.5 | 100 | 4.95 | 4.1 | 12.17215 | 46.243 | 42.487 | 1.89 | 0.04087 | 8.12231 | |
| 0.01 + 0.5 | 125 | 5.15 | 4.5 | 12.59333 | 54.854 | 49.244 | 1.537 | 0.02802 | 10.22715 | 2/4 |
| 0.01 + 0.5 | 125 | 5.25 | 3.95 | 14.48479 | 46.078 | 42.596 | 1.379 | 0.02993 | 7.556752 | 2/4 |
| 0.01 + 1.0 | 50 | 4.65 | 4.6 | 8.67431 | 51.762 | 49.091 | 0.667 | 0.01289 | 5.160156 | 2/4 |

TABLE II-continued

| NaCl [ ] + KOH (% w/v) | Voltage (V) | major axis a (cm) | minor axis b (cm) | surface area (cm2) | wt b/f hting (g), init | wt a/t hting w/o peel | Peel wt (g) | peel/init | wt loss per init (%) | Date |
|---|---|---|---|---|---|---|---|---|---|---|
| 0.01 + 1.0 | 50 | 5 | 4.45 | 11.65205 | 56.453 | 50.67 | 2.417 | 0.04281 | 10.24392 | 2/4 |
| 0.01 + 1.0 | 100 | 5.35 | 3.8 | 15.385 | 41.765 | 37.95 | 1.034 | 0.02476 | 9.134443 | 2/4 |
| 0.01 + 1.0 | 90 | 5 | 4 | 12.71496 | 46.4 | 40.408 | 2.945 | 0.06347 | 12.91379 | 2/4 |
| NaCl/CaCl2 | | | | | | | | | | |
| 0.01 + 1.0 | 100 | 5.45 | 3.85 | 15.99415 | 42.205 | 37.877 | 3.197 | 0.07575 | 10.25471 | 4/11 |
| 0.01 + 1.0 | 125 | 5.6 | 4.22 | 16.46859 | 55.199 | 44.448 | 4.31 | 0.07808 | 19.4768 | 4/11 |
| 0.01 + 1.0 | 150 | 5.8 | 4.4 | 17.61102 | 60.246 | 52.129 | 4.016 | 0.06666 | 13.47309 | 4/11 |
| 0.01 + 2.0 | 75 | 5.55 | 4.1 | 16.31636 | 51.441 | 45.876 | 3.087 | 0.06001 | 10.81822 | 4/11 |
| 0.01 + 2.0 | 100 | | | | | | | | No cracking | 4/11 |
| 0.01 + 2.0 | 125 | | | | | | | | No cracking | 4/11 |
| NaCl/NaOH/CaCl2 | | | | | | | | | | |
| 0.01 + 0.5 + 0.2 | 50 | 5.1 | 3.9 | 13.56406 | 45.385 | 39.782 | 1.556 | 0.03428 | 12.34549 | 2/7 |
| 0.01 + 0.5 + 0.2 | 75 | 5 | 3.95 | 12.81147 | 41.504 | 35.724 | 1.93 | 0.0465 | 13.92637 | 2/7 |
| 0.01 + 0.5 + 0.2 | 100 | 4.75 | 4.15 | 10.71426 | 46.122 | 39.582 | 2.366 | 0.0513 | 14.17978 | 2/7 |
| 0.01 + 0.5 + 0.5 | 75 | 5.2 | 4.05 | 13.96807 | 42.267 | 36.398 | 2.084 | 0.04931 | 13.88554 | 2/7 |
| Pure KOH | | | | | | | | | | |
| 7% | 90 C. on hot plate | 4.3 | 4.1 | 7.2341 | 35.947 | 30.948 | 0.948 | 0.02637 | 13.90658 | 1/21 |
| 7% | double beaker | 5.65 | 4.5 | 16.27996 | 54.227 | 48.838 | 1.903 | 0.03509 | 9.937854 | 1/24 |
| Pure NaOH | | | | | | | | | | |
| 7% | hot plate | 4.6 | 4.45 | 8.295821 | 56.668 | 50.884 | 3.649 | 0.06439 | 10.20682 | 1/21 |
| 7% | double beaker | 5.3 | 4.7 | 13.14188 | 61.432 | 55.438 | 1.541 | 0.02508 | 9.75713 | 1/24 |

TABLE III

| NaCl [ ] + NaOH (% w/v) | Voltage (V) | major axis a (cm) | minor axis b (cm) | surface area (cm2) | wt b/f hting (g), init | wt a/t hting w/o peel | Peel wt (g) | peel/init | wt loss per init (%) | Date |
|---|---|---|---|---|---|---|---|---|---|---|
| 0.01 + 0.01 | 200 | 5.6 | 4.65 | 15.54988 | 53.89 | 33.729 | 6.516 | 0.12091 | 37.41139 | 1/30 |
| 0.01 + 0.01 | 200 | 5.8 | 4 | 18.24663 | 48.897 | 41.521 | 2.956 | 0.06045 | 15.08477 | 12/15 |
| 0.01 + 0.01 | 300 | 5.5 | 3.1 | 16.91377 | 38.791 | 25.163 | 2.781 | 0.07169 | 35.13186 | 12/15 |
| 0.01 + 0.01 | 300 | 5.7 | 4.3 | 17.05354 | 58.038 | 37.352 | 3.724 | 0.06416 | 35.64217 | 1/30 |
| 0.01 + 0.01 | 400 | 5.5 | 4.5 | 15.15984 | 62.949 | 55.972 | 2.703 | 0.04294 | 11.08358 | 1/30 |
| 0.01 + 0.01 | 400 | 5.9 | 4.15 | 18.77024 | 48.715 | 33.233 | 4.005 | 0.08221 | 31.78077 | 12/15 |
| 0.01 + 0.05 | 200 | 5.6 | 4.1 | 10.95579 | 52.152 | 46.439 | 3.331 | 0.06387 | 10.95452 | 12/13 |
| 0.01 + 0.05 | 200 | 4.9 | 4.15 | 11.72209 | 41.062 | 25.282 | 3.131 | 0.07625 | 38.42969 | 1/30 |
| 0.01 + 0.05 | 300 | 5.4 | 4.7 | 13.8975 | 65.739 | 46.772 | 7.212 | 0.10971 | 28.85198 | 1/30 |
| 0.01 + 0.05 | 350 | 5.1 | 3.65 | 13.94464 | 37.506 | 25.076 | 2.737 | 0.07297 | 33.14136 | 12/13 |
| 0.01 + 0.05 | 350 | 5.15 | 4.4 | 12.85383 | 54.717 | 44.55 | 5.027 | 0.09187 | 18.58106 | 1/30 |
| 0.01 + 0.1 | 100 | 5.65 | 4.1 | 17.02901 | 54.086 | 42.455 | 2.173 | 0.04018 | 21.50464 | 1/31 |
| 0.01 + 0.1 | 100 | 5.4 | 3.9 | 15.58279 | 41.697 | 34.424 | 1.103 | 0.02645 | 17.4425 | 1/9 |
| 0.01 + 0.1 | 100 | 5.9 | 3.93 | 19.0492 | 50.867 | 41.648 | 1.797 | 0.03533 | 18.12373 | 1/8 |
| 0.01 + 0.1 | 150 | 5.45 | 4.05 | 15.69472 | 43.728 | 37.527 | 1.574 | 0.036 | 14.18085 | 1/8 |
| 0.01 + 0.1 | 150 | 5.5 | 4 | 16.12332 | 41.475 | 35.168 | 1.615 | 0.03894 | 15.20675 | 1/9 |
| 0.01 + 0.1 | 150 | 5.1 | 4.05 | 13.28823 | 43.306 | 33.169 | 1.86 | 0.04295 | 23.40784 | 1/31 |
| 0.01 + 0.1 | 200 | 5.2 | 4.3 | 13.44893 | 54.409 | 39.245 | 4.032 | 0.07411 | 27.87039 | 1/31 |
| 0.01 + 0.1 | 200 | 6.05 | 3.3 | 20.48858 | 37.913 | 28.091 | 2.648 | 0.06984 | 25.90668 | 1/9 |
| 0.01 + 0.1 | 200 | 6 | 3.8 | 19.89435 | 41.494 | 33.196 | 2.03 | 0.04892 | 19.99807 | 1/8 |
| 0.01 + 0.5 | 75 | 6.12 | 3.85 | 20.72009 | 50.765 | 47.095 | 1.413 | 0.02783 | 7.22939 | 1/8 |
| 0.01 + 0.5 | 75 | 5.8 | 3.65 | 18.60891 | 38.009 | 33.162 | 2.476 | 0.06514 | 12.75224 | 1/9 |
| 0.01 + 0.5 | 100 | 5.85 | 3.85 | 18.77742 | 48.081 | 43.878 | 1.571 | 0.03267 | 8.741499 | 1/9 |
| 0.01 + 0.5 | 100 | 5.6 | 3.5 | 17.3656 | 37.228 | 31.959 | 1.904 | 0.05114 | 14.15333 | 1/9 |
| 0.01 + 0.5 | 100 | 5.83 | 4.5 | 17.6416 | 53.03 | 44.839 | 3.095 | 0.05836 | 15.44597 | 1/8 |
| 0.01 + 0.5 | 100 | 5.55 | 3.95 | 16.5456 | 43.14 | 37.586 | 2.599 | 0.06025 | 12.87436 | 1/8 |
| 0.01 + 1.0 | 40 | 5.5 | 4.45 | 15.27458 | 59.804 | 53.004 | 1.914 | 0.032 | 11.37048 | 1/31 |
| 0.01 + 1.0 | 40 | 5.85 | 3.8 | 18.82721 | 44.923 | 0 | 0 | 0 | 100 | 12/15 |
| 0.01 + 1.0 | 50 | 5.3 | 4.3 | 14.15813 | 47.987 | 41.747 | 1.525 | 0.03178 | 13.00352 | 1/10 |
| 0.01 + 1.0 | 50 | 5.5 | 4.5 | 15.15984 | 56.598 | 51.454 | 1.381 | 0.0244 | 9.08866 | 1/31 |
| 0.01 + 1.0 | 75 | 5.5 | 4.3 | 15.59372 | 55.598 | 50.922 | 2.028 | 0.03648 | 8.410374 | 1/10 |
| 0.01 + 1.0 | 80 | 5.85 | 4.05 | 18.54225 | 53.903 | 46.592 | 3.633 | 0.0674 | 13.56325 | 1/31 |
| 0.01 + 1.0 | 90 | 5.4 | 4 | 15.42894 | 48.265 | 42.623 | 3.377 | 0.06997 | 11.68963 | 12/15 |
| 0.03 + 0.01 | 200 | 5.1 | 4 | 13.38424 | 44.338 | 33.906 | 2.839 | 0.06403 | 23.52835 | 1/9 |
| 0.03 + 0.01 | 300 | 5 | 4.3 | 12.04653 | 46.682 | 37.728 | 2.022 | 0.04331 | 19.18084 | 1/9 |
| 0.03 + 0.01 | 300 | 5.8 | 4.12 | 18.08143 | 45.476 | 37.332 | 2.279 | 0.05011 | 17.90835 | 1/9 |

TABLE IV

| NaCl [ ] + NaOH (% w/v) | Voltage (V) | wt loss per init (%) | NaCl [ ] + NaOH (% w/v) | Voltage (V) | wt loss per init (%) |
|---|---|---|---|---|---|
| 0.01 + 0.01 | 200 | 26.24808 | 0.01 + 0.01/200 | 200 | 26.248 |
| 0.01 + 0.01 | 300 | 35.38701 | 0.01 + 0.01/300 | 300 | 35.387 |
| 0.01 + 0.01 | 400 | 21.43217 | 0.01 + 0.01/400 | 400 | 21.432 |
| 0.01 + 0.05 | 200 | 24.6921 | 0.01 + 0.05/200 | 200 | 24.692 |
| 0.01 + 0.05 | 300 | 28.85198 | 0.01 + 0.05/300 | 300 | 28.852 |
| 0.01 + 0.05 | 350 | 25.86121 | 0.01 + 0.05/350 | 350 | 25.861 |
| 0.01 + 0.1 | 100 | 19.02363 | 0.01 + 0.1/100 | 100 | 19.024 |
| 0.01 + 0.1 | 150 | 17.59848 | 0.01 + 0.1/150 | 150 | 17.598 |
| 0.01 + 0.1 | 200 | 24.59171 | 0.01 + 0.1/200 | 200 | 24.592 |
| 0.01 + 0.5 | 75 | 9.990817 | 0.01 + 0.5/75 | 75 | 9.9908 |
| 0.01 + 0.5 | 100 | 12.80379 | 0.01 + 0.5/100 | 100 | 12.804 |
| 0.01 + 1.0 | 40 | 11.37048 | 0.01 + 1.0/40 | 40 | 11.37 |
| 0.01 + 1.0 | 50 | 11.04609 | 0.01 + 1.0/50 | 50 | 11.046 |
| 0.01 + 1.0 | 75 | 8.410374 | 0.01 + 1.0/75 | 75 | 8.4104 |
| 0.01 + 1.0 | 80 | 13.56325 | 0.01 + 1.0/80 | 80 | 13.563 |
| 0.01 + 1.0 | 90 | 11.68963 | 0.01 + 1.0/90 | 90 | 11.69 |
| 0.03 + 0.01 | 200 | 23.52835 | 0.03 + 0.01/200 | 200 | 23.528 |
| 0.03 + 0.01 | 300 | 18.54459 | 0.03 + 0.01/300 | 300 | 18.545 |
| | | | pure 7% KOH | | 11.922 |
| | | | pure 7% NaOH | | 9.982 |

TABLE V

| NaCl [ ] + KOH (% w/v) | Voltage (V) | major axis a (cm) | minor axis b (cm) | surface area (cm2) | wt b/f hting (g), init | wt a/t hting w/o peel | Peel wt (g) | peel/init | wt loss per init (%) | Date |
|---|---|---|---|---|---|---|---|---|---|---|
| 0.01 + 0.5 | 50 | 5.65 | 4.1 | 17.02901 | 52.48 | 41.844 | 1.593 | 0.03035 | 20.26677 | 1/14 |
| 0.01 + 0.5 | 50 | 5.2 | 4.15 | 13.77292 | 42.069 | 36.234 | 1.034 | 0.02458 | 13.87007 | 2/4 |
| 0.01 + 0.5 | 50 | 5.15 | 4.2 | 13.32148 | 57.567 | 47.276 | 1.772 | 0.03078 | 17.87656 | 2/4 |
| 0.01 + 0.5 | 75 | 5.3 | 4.2 | 14.3688 | 55.533 | 50.174 | 1.882 | 0.03389 | 9.650118 | 2/4 |
| 0.01 + 0.5 | 75 | 4.85 | 4.05 | 11.61396 | 41.765 | 35.425 | 2.06 | 0.04932 | 15.18017 | 1/16 |
| 0.01 + 0.5 | 75 | 5.5 | 4.25 | 15.6919 | 50.382 | 46.206 | 1.114 | 0.02211 | 8.288675 | 1/14 |
| 0.01 + 0.5 | 100 | 5.45 | 4.6 | 14.54199 | 55.99 | 51.097 | 1.062 | 0.01897 | 8.739061 | 1/14 |
| 0.01 + 0.5 | 100 | 4.95 | 4.1 | 12.17215 | 46.243 | 42.487 | 1.89 | 0.04087 | 8.12231 | 2/4 |
| 0.01 + 0.5 | 100 | 5.4 | 3.55 | 16.00335 | 41.622 | 33.905 | 2.478 | 0.05954 | 18.54068 | 1/16 |
| 0.01 + 0.5 | 125 | 5.5 | 4.2 | 10.83214 | 39.295 | 34.594 | 1.886 | 0.048 | 11.96335 | 1/16 |
| 0.01 + 0.5 | 125 | 5.15 | 4.5 | 12.59333 | 54.854 | 49.244 | 1.537 | 0.02802 | 10.22715 | 2/4 |
| 0.01 + 0.5 | 125 | 5.25 | 3.95 | 14.48479 | 46.078 | 42.596 | 1.379 | 0.02993 | 7.556752 | 2/4 |
| 0.01 + 1.0 | 50 | 4.65 | 4.6 | 8.67431 | 51.762 | 49.091 | 0.667 | 0.01289 | 5.160156 | 2/4 |
| 0.01 + 1.0 | 50 | 5 | 4.45 | 11.65205 | 56.453 | 50.67 | 2.417 | 0.04281 | 10.24392 | 2/4 |
| 0.01 + 1.0 | 50 | 5.9 | 4.1 | 18.83989 | 56.614 | 52.776 | 1.283 | 0.02266 | 6.779242 | 1/14 |
| 0.01 + 1.0 | 75 | 4.95 | 4.3 | 11.69904 | 48.572 | 44.18 | 1.106 | 0.02277 | 9.042247 | 1/14 |
| 0.01 + 1.0 | 76.4 | 5.4 | 3.95 | 15.50778 | 47.278 | 42.892 | 1.854 | 0.03921 | 9.277042 | 1/14 |
| 0.01 + 1.0 | 75 | 5.6 | 4.1 | 10.95579 | 52.152 | 46.439 | 3.331 | 0.06387 | 10.95452 | 1/16 |
| 0.01 + 1.0 | 90 | 5 | 4 | 12.71496 | 46.4 | 40.408 | 2.945 | 0.06347 | 12.91379 | 2/4 |
| 0.01 + 1.0 | 100 | 5.5 | 4.3 | 10.97372 | 56.311 | 46.218 | 4.991 | 0.08863 | 17.92367 | 1/16 |
| 0.01 + 1.0 | 100 | 5.35 | 3.8 | 15.385 | 41.765 | 37.95 | 1.034 | 0.02476 | 9.134443 | 2/4 |

TABLE VI

| NaCl [ ] + KOH (% w/v) | Voltage (V) | wt loss per init (%) | NaCl [ ] + KOH (% w/v) | Voltage (V) | wt loss per init (%) |
|---|---|---|---|---|---|
| 0.01 + 0.5 | 50 | 17.3378 | 0.01 + 0.5/50 | 50 | 17.3378 |
| 0.01 + 0.5 | 75 | 11.03966 | 0.01 + 0.5/75 | 75 | 11.0397 |
| 0.01 + 0.5 | 100 | 11.80068 | 0.01 + 0.5/100 | 100 | 11.8007 |
| 0.01 + 0.5 | 125 | 7.464294 | 0.01 + 0.5/125 | 125 | 7.46429 |
| 0.01 + 1.0 | 50 | 7.394439 | 0.01 + 1.0/50 | 50 | 7.39444 |
| 0.01 + 1.0 | 75 | 9.757935 | 0.01 + 1.0/75 | 75 | 9.75794 |
| 0.01 + 1.0 | 90 | 12.91379 | 0.01 + 1.0/90 | 90 | 12.9138 |
| 0.01 + 1.0 | 100 | 13.52906 | 0.01 + 1.0/100 | 100 | 13.5291 |
| | | | pure 7% KOH | | 11.9222 |
| | | | pure 7% NaOH | | 9.98197 |

TABLE VI-continued

| NaCl [ ] + KOH (% w/v) | Voltage (V) | wt loss per init (%) | NaCl [ ] + KOH (% w/v) | Voltage (V) | wt loss per init (%) |
|---|---|---|---|---|---|
| | | | NaCl/CaCl2 | | |
| 0.01 + 1.0 | 100 | 10.25471 | | | |
| 0.01 + 1.0 | 125 | 19.4768 | | | |
| 0.01 + 1.0 | 150 | 13.47309 | | | |
| | | | NaCl/NaOH/CaCl2 | | |
| 0.01 + 0.5 + 0.2 | 50 | 12.34549 | | | |
| 0.01 + 0.5 + 0.2 | 75 | 13.92637 | | | |
| 0.01 + 0.5 + 0.2 | 100 | 14.17978 | | | |
| Pure KOH | | | average | | |
| 7% | 13.907 | | | | 11.92222 |
| 7% | 9.9379 | | | | |
| | | | Pure NaOH | | |
| 7% | 10.207 | | | | 9.981974 |
| 7% | 9.7571 | | | | |

The foregoing descriptions of specific embodiments and examples of the present invention have been presented for purposes of illustration and description. They are not intended to be exhaustive or to limit the invention to the precise forms disclosed, and obviously many modifications and variations are possible in light of the above teachings. It will be understood that the invention is intended to cover alternatives, modifications and equivalents. The embodiments were chosen and described in order to best explain the principles of the invention and its practical application, to thereby enable others skilled in the art to best utilize the invention and various embodiments with various modifications as are suited to the particular use contemplated. It is therefore to be understood that within the scope of the appended claims, the invention may be practiced otherwise than as specifically described herein.

What is claimed is:

1. A method of removing a peel from a tomato comprising the steps of:
adding an electrically conductive fluid comprising a mixture of an about 0.01% salt solution and an about 0.5% to about 1.0% alkaline solution and a tomato to a container;
subjecting the electrically conductive fluid and the tomato to a current for a time sufficient to create a first boiling front at a blossom end of the tomato between an inside of the peel and an outer flesh of the tomato and a second boiling front at a stem end of the tomato between the inside of the peel and the outer flesh and advancing the boiling fronts towards each other until the boiling fronts cause a pressure that removes the peel from the tomato, leaving a whole peeled tomato; and
removing the peel and the peeled tomato from the container.

2. The method of claim 1, wherein:
the step of removing the peel is performed by a separator.

3. The method of claim 1, wherein:
the current causes an increase in diffusion of fluid through the peel.

4. The method of claim 1, wherein:
the temperature of the electrically conductive fluid is in the range of about 20 to about 25° C. prior to the application of the current.

5. The method of claim 1, wherein:
the salt solution is an aqueous solution comprising at least one of: NaCl and KCl.

6. The method of claim 1, wherein:
the alkaline solution is an aqueous solution comprising at least one of: NaOH and KOH.

* * * * *

UNITED STATES PATENT AND TRADEMARK OFFICE
CERTIFICATE OF CORRECTION

PATENT NO. : 7,550,165 B2 Page 1 of 1
APPLICATION NO. : 10/864663
DATED : June 23, 2009
INVENTOR(S) : Sastry et al.

It is certified that error appears in the above-identified patent and that said Letters Patent is hereby corrected as shown below:

In column 10 of the patent, line 15 under the "Date" column in TABLE II, please add -- 2/4 --.

Signed and Sealed this

Fourth Day of August, 2009

JOHN DOLL
*Acting Director of the United States Patent and Trademark Office*